(12) United States Patent
Bernhoff et al.

(10) Patent No.: US 6,226,163 B1
(45) Date of Patent: May 1, 2001

(54) DEVICE AND METHOD RELATING TO PROTECTION OF AN OBJECT AGAINST OVER-CURRENTS COMPRISING OVER-CURRENT REDUCTION

(75) Inventors: Hans Bernhoff, Västerås; Mikael Bergkvist, Uppsala; Mats Ekberg, Västerås; Jan Isberg, Västerås; Mats Leijon, Västerås; Li Ming, Västerås; Anders Sunesson, Åkarp; Dan Windmar, Vittinge; Bertil Berggren, Västerås, all of (SE)

(73) Assignee: Asea Brown Boveri AB, Vasteras (SE)

( * ) Notice: Subject to any disclaimer, the term of this patent is extended or adjusted under 35 U.S.C. 154(b) by 0 days.

(21) Appl. No.: 09/029,648

(22) PCT Filed: May 27, 1997

(86) PCT No.: PCT/SE97/00880

§ 371 Date: Mar. 2, 1998

§ 102(e) Date: Mar. 2, 1999

(87) PCT Pub. No.: WO98/27634

PCT Pub. Date: Jun. 25, 1998

(30) Foreign Application Priority Data

Dec. 17, 1996 (SE) .................................................. 9604629
Feb. 3, 1997 (SE) .................................................. 9700335

(51) Int. Cl.[7] ............................................ H02H 3/00
(52) U.S. Cl. .................... 361/93.1; 361/56; 361/115
(58) Field of Search .......................... 361/56, 58, 111, 361/115, 117, 119, 93.1, 103

(56) References Cited

U.S. PATENT DOCUMENTS

| | | | |
|---|---|---|---|
| 3,418,530 | 12/1968 | Cheever | 317/31 |
| 4,091,139 | 5/1978 | Quirk | 428/244 |
| 4,109,098 | 8/1978 | Olsson et al. | 174/106 SC |
| 4,134,146 | 1/1979 | Stetson | 361/130 |
| 4,164,772 | 8/1979 | Hingorani | 361/58 |
| 4,184,186 | 1/1980 | Barkan | 361/10 |
| 4,360,748 | 11/1982 | Raschbichler et al. | 310/13 |
| 4,429,244 | 1/1984 | Nikitin et al. | 310/254 |
| 4,924,342 | 5/1990 | Lee | 361/58 |
| 5,036,165 | 7/1991 | Elton et al. | 174/102 SC |
| 5,136,459 | 8/1992 | Fararooy | 361/93 |
| 5,153,460 | 10/1992 | Bovino et al. | 307/108 |
| 5,388,021 | * 2/1995 | Stahl | 361/56 |
| 5,452,170 | 9/1995 | Ohde et al. | 361/13 |

FOREIGN PATENT DOCUMENTS

| | | | |
|---|---|---|---|
| 0 120 154 | 3/1983 | (EP) | H01B/13/02 |
| 0 280 759 | 4/1987 | (EP) | H02H/3/02 |
| 0 695 019 | 7/1995 | (EP) | H02K/3/48 |
| 2 556 146 | 12/1993 | (FR) | H02K/3/34 |
| 4 53236 B | 1/1982 | (SE) | H02K/3/40 |
| 9 55369 | 3/1981 | (SU) | H02K/1/20 |

* cited by examiner

Primary Examiner—Stephen W. Jackson
(74) Attorney, Agent, or Firm—Dykema Gossett PLLC

(57) ABSTRACT

This invention is related to a device and a method in an electric power plant for protection of an object (1) against over-currents from a network (3) or another equipment included in the high voltage plant, the device comprising a switching device (4) in a line (2) between the object and the network/equipment. The line (2) between the object and the network/equipment is connected to an arrangement (5) reducing over-currents towards the object (1), said arrangement (5) being actuatable for over-current reduction with the assistance of an over-current condition detecting arrangement (11–13) within a time period substantially less than the break-time of the switching device (4).

46 Claims, 3 Drawing Sheets

DEVICE AND METHOD RELATING TO PROTECTION OF AN OBJECT AGAINST OVER-CURRENTS COMPRISING OVER-CURRENT REDUCTION

FILED OF THE INVENTION AND PRIOR ART

This invention is related to a device in an electric power plant for protection of an object connected to an electric power network or another equipment in the electric power plant from fault-related over-currents, the device comprising a switching device in a line between the object and the network/equipment. In addition, the invention includes a method for protecting the object from over-currents.

The electric object in question is preferably formed by a rotating electric machine having a magnetic circuit, for instance a generator, motor (both synchronous and asynchronous motors are included) or synchronous compensator requiring protection against fault-related over-currents, i.e. in practice short-circuit currents. As will be discussed in more detail hereunder, the structure of the rotating electric machine may be based upon conventional as well as non-conventional technique.

The present invention is intended to be applied in connection with medium or high voltage. According to IEC norm, medium voltage refers to 1–72,5 kV whereas high voltage is >72,5 kV. Thus, transmission, sub-transmission and distribution levels are included.

In prior power plants of this nature one has resorted to, for protection of the object in question, a conventional circuit-breaker (switching device) of such a design that it provides galvanic separation on breaking. Since this circuit breaker must be designed to be able to break very high currents and voltages, it will obtain a comparatively bulky design with large inertia, which reflects itself in a comparatively long break-time. It is pointed out that the over-current primarily intended is the short-circuit current occurring in connection with the protected object, for instance as a consequence of faults in the electric insulation system of the protected object. Such faults means that the fault current (short-circuit current) of the external network/equipment will tend to flow through the arc created in the object. The result may be a very large breakdown. It may be mentioned that for the Swedish power network, the dimensioning short-circuit current/fault-current is 63 kA. In reality, the short-circuit current may amount to 40–50 kA.

A problem with said circuit-breaker is the long-break time thereof. The dimensioning break-time (IEC-norm) for completely accomplished breaking is 150 milliseconds (ms). It is associated to difficulties to reduce this break-time to less than 50–130 ms depending upon the actual case. The consequence thereof is that when there is a fault in the protected object, a very high current will flow through the same during the entire time required for actuating the circuit-breaker to break. During this time the full fault current of the external power network involves a considerable load on the protected object. In order to avoid damage and complete breakdown with respect to the protected object, one has, according to the prior art, constructed the object so that it manages, without appreciable damage, to be subjected to the short-circuit current/fault current during the break-time of the circuit breaker. It is pointed out that a short-circuit current (fault current) in the protected object may be composed of the own contribution of the object to the fault current and the current addition emanating from the network/equipment. The own contribution of the object to the fault current is not influenced by the functioning of the circuit-breaker but the contribution to the fault current from the network/equipment depends upon the operation of the circuit breaker. The requirement for constructing the protected object so that it may withstand a high short-circuit current/fault current during a considerable time period means substantial disadvantages in the form of more expensive design and reduced performance.

The rotating electric machines intended here comprise synchronous machines mainly used as generators for connection to distribution and transmission networks collectively denoted power networks hereunder. The synchronous machines are also used as motors and for phase compensation and voltage regulation, then as mechanically idling machines. The technical field also comprises double-fed machines, asynchronous converter cascades, external pole machines and synchronous flux machines.

The magnetic circuit referred to in this context may be air-wound but may also comprise a magnetic core of laminated, normal or oriented, sheet or other, for example amorphous or powder based, material, or any other action for the purpose of allowing an alternating flux, a winding, a cooling system etc., and may be disposed in the stator or the rotor of the machine, or in both.

It is, according to the invention, primarily the intention to protect a non-conventional rotating electric machine for direct connection to all kinds of high voltage power networks. Such a machine has its magnetic circuit designed with a threaded conductor, which is insulated with a solid insulation and in which earth has been incorporated.

In order to be able to explain and describe the non-conventional machine, a brief description of a rotating electric machine will first be given, exemplified on the basis of a synchronous machine. The first part of the description substantially relates to the magnetic circuit of such a machine and how it is constructed according to classical technique. Since the magnetic circuit referred to in most cases is located in the stator, the magnetic circuit below will normally be described as a stator with a laminated sheet metal core, the winding of which will be referred to as a stator winding and slots arranged for the winding in the laminated core will be referred to as stator slots or simply slots.

Most synchronous machines have a field winding in the rotor, where the main flux is generated by direct current, and an AC winding in the stator. The synchronous machines are normally of three-phase design and the invention mainly relates to such machines. Sometimes the synchronous machines are designed with salient poles. However, cylindrical rotors are used for two- or four-pole turbo generators and for double-fed machines. The latter have an AC winding in the rotor and this may be designed for the voltage levels of the power network.

The stator body for large synchronous machines are often made of sheet steel with a welded construction. The laminated core is normally made from varnished 0.35 or 0.5 mm electric sheet. For radial ventilation and cooling, the laminated core is, at least for medium size and large machines divided into packages with radial or axial ventilation channels. For larger machines, the sheet is punched into segments, which are attached to the stator body by means of wedges/dovetails. The laminated core is retained by pressure fingers and pressure plates. The stator winding is located in slots in the laminated core and the slots have, as a rule, a cross section as a rectangle or as a trapetzoid.

Polyphase AC windings are designed either as single layer or two-layer windings. In the case of single-layer windings, there is only one coil side per slot, and in the case of two-layer windings there are two coil sides per slot. By coil side is meant one or more conductors brought together in height and/or width and provided with a common coil insulation, i.e. an insulation intended to withstand the rated voltage of the machine relative to earth. Two layer windings are usually designed as diamond windings, whereas the single-layer windings, which are relevant in this connection may be designed as diamond windings or as a flat winding. In the case of a diamond winding, only one coil span (or possibly two coil spans) occurs, whereas flat windings are designed as concentric windings, i.e. with a greatly varying coil span. By coil span is meant the distance in circular measure between two coil sides belonging to the same coil, either in relation to the relevant pole pitch or in the number of intermediate slot pitches. Usually different variants of chording are used, for example fractional pitch, to give the winding the desired properties.

The type of winding substantially describes how the coils in the slots, that is the coil sides, are connected together outside the stator, that is at the coil ends. A typical coil side is formed by so called Roebel bars, in which certain of the bars have been made hollow for a coolant. A Roebel bar comprises a plurality of rectangular, parallel connected copper conductors, which are transposed 360 degrees along the slot. Ringland bars with transpositions of 540 degrees and other transpositions also occur. The transposition is necessary to avoid circulating currents. Between each strand there is a thin insulation, e.g. epoxy/glass fibre. The main insulation between the slot and the conductors is made, e.g., of epoxy/glass fibre/mica and has externally a thin semiconducting earth potential layer used for equalizing the electrical field. Externally of the sheet stack, one does not have any outer semiconducting earth potential layer, but an electric field control in the form of so called corona protection varnish intended to convert a radial field into an axial field, which means that the insulation on the coil ends occurs at a high potential relative to ground. The field control is a problem which sometimes gives rise to corona in the coil-end region, which may be destructive.

Normally all large machines are designed with a two-layer winding and equally large coils. Each coil is placed with one side in one of the layers and the other side in the other layer. This means that also coils cross each other in the coil-end. If more than two layers are used, these crossings render the winding work difficult and deteriorate the coil-end.

What has been stated above may be said to belong to classical technique when it comes to the rotating electrical machines in view.

During the last decades, there have been increasing requirements for rotating electric machines for higher voltages than what has previously been possible to design and produce. The maximum voltage level which, according to the state of the art, has been possible to achieve for synchronous machines with a good yield in the coil production is around 25–30 kV. It is also generally known that connection of a synchronous machine/generator to a power network must be made via a Δ/Y-connected so called step-up transformer, since the voltage of the power network normally lies at a higher level than the voltage of the rotating electric machine. Together with a synchronous machine, this transformer thus constitutes integrated parts of a plant. The transformer constitutes an extra cost and also entails the disadvantage that the total efficiency of the system is lowered. If it were possible to manufacture machines for considerably higher voltages, the step-up transformer could thus be omitted.

Certain attempts to a new approach as regards the design of synchronous machines are described, inter alia, in an article entitled "Water-and-oil-cooled Turbogenerator TVM-300" in J. Elektrotechnika, No. 1, 1970, pp 6–8, in U.S. Pat. No. 4,429,244 "Stator of generator" and in the Russian patent document CCCP patent 955369.

The water- and oil-cooled synchronous machine described in J. Elektroteknika is intended for voltages up to 20 kV. The article describes a new insulation system consisting of oil/paper insulation, which makes it possible to emerse the stator completely in oil. The oil can then be used as a coolant while at the same time using it as insulation. To prevent oil in the stator from leaking out towards the rotor, a dielectric oil-separating ring is provided at the internal surface of the core. The stator winding is made from conductors with an oval hollow shape provided with oil and paper insulation. The coil sides with their insulation are secured in the slots made with rectangular cross section by means of wedges. As coolant oil is used both in the hollow conductors and in holes in the stator walls. Such cooling systems, however, entail a large number of connections of both oil and electricity at the coil-ends. The thick insulation also entails an increased radius of curvature of the conductors, which in turn results in an increased size of the winding overhang.

The above mentioned US patent relates to the stator part of a synchronous machine which comprises a magnetic core of laminated sheet with trapetsoidal slots for the stator winding. The slots are tapered since the need of insulation of the stator winding is smaller towards the interior of the rotor where that part of the winding which is located nearest the neutral point is located. In addition, the stator part comprises a dielectric oil-separating cylinder nearest the inner surface of the core. This part may increase the magnetization requirement relative to a machine without this ring. The stator winding is made of oil-immersed cables with the same diameter for each coil layer. The layers are separated from each other by means of spacers in the slots and secured by wedges. What is special for the winding is that it comprises two so called half-windings connected in series. One of the two half-windings is located, centered, inside an insulating sleeve. The conductors of the stator winding are cooled by surrounding oil. A disadvantage with such a large quantity of oil in the system is that the risk of leakage and the considerable amount of cleaning work which may result from a fault condition. Those parts of the insulating sleeve which are located outside the slots have a cylindrical part and a conical termination, the duty of which is to control the electric field strength in the region where the cable leaves the laminated core.

From CCCP 955369 it is clear, in another attempt to raise the rated voltage of the synchronous machine, that the oil-cooled stator winding comprises a conventional high-voltage cable with the same dimension for all the layers. The cable is placed in stator slots formed as circular, radially located openings corresponding to the cross section area of the cable and the necessary space for fixing and for coolant. The different radially located layers of the winding are surrounded by and fixed in insulated tubes. Insulating spacers fix the tubes in the stator slot. Because of the oil-cooling, an internal dielectric ring is also here needed for sealing the oil-coolant against the internal air gap. The structure shown does not have any reduction-of the insulation or of the stator slots. The structure comprises a very thin radial waist between different stator slots, which means a large slot leakage flux which significantly influences the magnetization requirement of the machine.

Machine designs according to the pieces of literature accounted for mean that the electromagnetic material in the stator is not used to an optimum. The stator teeth should adjoin as closely to the casing of the coil sides as possible from a magnetical point of view. It is highly desirable to have a stator tooth having, at each radial level, a maximum width since the width of the tooth affects considerably the losses of the machine and, accordingly, the need for magnetization. This is particularly important for machines with higher voltage since the number of conductors per slot becomes large therein.

OBJECT OF THE INVENTION

The primary object of the present invention is to devise ways to design the device and the method so as to achieve better protection for the object and, accordingly, a reduced load on the same, a fact which means that the object itself does not have to be designed to withstand a maximum of short-circuit currents/fault currents during relatively long time periods.

A secondary object with the invention is to design the protection device and method such that an adequate protection is achieved for rotating electric machines, the design of which is based upon non-conventional design principles, which may mean that the design does not have the same resistance to fault-related over-currents, internal as well as external, as the conventional machines of today.

SUMMARY OF THE INVENTION

According to the invention, the object indicated above is achieved in that the line between the object and the switching device is connected to an over-current reducing arrangement, which is actuatable for over-current reduction with assistance of an over-current conditions detecting arrangement within a time-period substantially less than the break-time of the switching device.

Thus, the invention is based upon the principle not to rely for breaking purposes only upon a switching device which finally establishes galvanic separation, but instead use a rapidly operating over-current reducing arrangement, which, without effecting any real breaking of the over-current, nevertheless reduces the same to such an extent that the object under protection will be subjected to substantially reduced strains and, accordingly, a smaller amount of damages. The reduced over-current/fault current means, accordingly, that when the switching device establishes galvanic separation, the total energy injection into the protected object will have been much smaller than in absence of the over-current reducing arrangement.

According to a preferred embodiment of the invention, the over-current reducing arrangement is designed as comprising an over-current diverter for diversion of over-currents to earth or otherwise another unit having a lower potential than the network/equipment.

According to a particularly preferred embodiment of the invention, measures have been taken to obtain a reduction of the time-period, during which the current already reduced by means of the over-current reducing arrangement may flow into the protected object. For this purpose the device comprises a further breaker arranged in the line between the circuit breaker and the object, said further breaker being designed to break at a lower voltage and current than the switching device and therefore may be designed with a shorter break-time than the switching device as a consequence of a smaller need for movement and a smaller weight of the movable contact(s) of the breaker, said further breaker being arranged to break not until a time when the over-current towards or away from the protected object has been reduced by means of the over-current reducing arrangement. More specifically, the movement required of the movable contact(s) of the further breaker is smaller due to lower voltage whereas the weight of the contact(s) may be held lower due to the fact that the lower current does not require such large contact areas.

As is more closely defined in the claims, the invention is applicable on rotating electric machines having magnetic circuits designed by means of cable technology. These machines may under certain conditions become sensitive to electrical faults. Such a design may for instance be given a lower impedance than what is considered conventional today within the power field. This means a lower resistance against fault-related over-currents than that presented by conventional machines of today. If the machines, besides, have been designed from the start to operate with a higher electrical voltage than the conventional machines of today, the strain on the electrical insulation system of the machine, caused by the resulting higher electrical field, becomes, of course, greater. This means that the machine may be more efficient, more economical, mechanically lighter, more reliable, less expensive to use and generally more economical than conventional machines, and the machine may manage without the usual connection to other electromagnetic machines, but such a machine places great demands on the electrical protection to eliminate, or at least reduce, the consequences of a breakdown in the machine in question. A combination of the protection device according to the invention and a rotating electric machine designed in this way means, accordingly, an optimization of the plant in its entirety.

The electric machine primarily intended with the invention operates with such a high voltage that the $\Delta/Y$-connected step-up transformer mentioned above may be omitted, i.e. machines with a considerably higher voltage than machines according to the state of the art is intended in order to be able to perform direct connection to power networks at all types of high voltage. This means considerably lower investment costs for systems with a rotating electric machine and the total efficiency of the system can be increased.

A rotating electric machine according to the invention entails a considerably reduced thermal stress on the stator. Temporary overloads of the machine does become less critical and it will be possible to drive a machine at overload for a longer period of time without running the risk of damage arising. This means considerable advantages for owners of power generating plants, who are forced today, in case of operational disturbances, to rapidly switch to other equipment in order to ensure the delivery requirements laid down by law. With a rotating electric machine of such a design here contemplated, the maintenance costs can be significantly reduced because a transformer does not have to be included in the system for connecting the machine to the power network.

The invention also includes a synchronous compensator directly connected to the power network.

To increase the power of a rotating electric machine, it is known to attempt to increase the current in the AC coils. This has been achieved by optimizing the quantity of conducting material, that is by close-packing of rectangular conductors in the rectangular rotor slots. The aim has been to handle the increase in temperature resulting from this by increasing the quantity of insulating material and using more temperature resistant and hence more expensive insulating materials. The high temperature and field load on the insulation have also caused problems with the life of the insulation. In the relatively thick-walled insulating layers which are used for high voltage equipment, for example impregnated layers of mica tape, partial discharges, pd, constitute a serious problem. When manufacturing these insulating layers, cavities, pores and the like, will easily arise, in which internal corona discharges arise when the insulation is subjected to high electric field strengths. These corona discharges gradually degrade the material and may lead to electric break-down through the insulation.

In order to be able to increase the power of a rotating electric machine in a technically and economically justifiable way, this must be achieved by ensuring that the insulation is not broken down by the phenomena described above. This can be achieved by means of an insulation system produced so that the risk for cavities and pores is minimal. The insulation system about said at least one current-carrying conductor included in the winding in question comprises an electrically insulating layer of a solid insulating material, about which there is arranged an outer layer of a semiconducting material. An inner layer of semiconducting material is arranged inwardly of the insulating layer. Said at least one conductor is arranged inwardly of the inner layer.

In order to obtain a good thermal resistance, it is preferred that at least one of the inner and outer layers have substantially equal coefficients of thermal expansion as the insulating material. In practice, both layers and the insulating material have substantially equal thermal coefficients of expansion. This in combination with the fact that the inner and outer layers are bonded relative to the insulating material along substantially the entire interface means that the insulating material as well as inner and outer layers will form a monolithic part such that defects due to different temperature expansion do not occur. The electrical load on the insulation increases as a consequence of the fact that the semiconducting layers about the insulating material will form equipotential surfaces meaning that the electrical field in the insulating material will be distributed evenly over the same. The outer semiconducting layer is suitably connected to earth potential or otherwise a low potential. This means that for such a cable the outer layer about the insulating material may be kept at earth potential for the whole length of the cable.

The outer semiconducting layer may also be cut off at suitable locations along the length of the conductor and each cut-off partial length may be directly connected to earth potential. Around the outer semiconducting layer there may also be arranged other layers, casings and the like, such as a metal shield and a protective mantle. A further improvement of the invention is achieved by making the coils and the slots, in which the coils are placed, round instead of rectangular. By making the cross section of the coils round, these will be surrounded by a constant magnetic field without concentrations where magnetic separation may arise. Also the electric field in the coil will be distributed evenly over the cross section and local loads on the insulation are considerably reduced. In addition, it is easier to place circular coils in slots in such a way that the number of coil sides per coil group may increase and an increase of the voltage may take place without the current in the conductors having to be increased.

Additional improvements may also be achieved by composing the conductor from smaller parts, so called strands. The strands may be insulated from each other and only a small number of strands may be left uninsulated and in contact with the inner semiconducting layer to ensure that this is at the same potential as the conductor.

The outer semiconducting layer should present such electrical properties that a potential equalization along the conductor is ensured. However, the outer layer may not present such conduction properties that a current will be carried along the surface, which could give cause to losses, which in turn could cause undesired thermal load. The inner semiconducting layer must have a sufficient electrical conductivity to ensure potential equalization and, accordingly, equalization of the electric field outside the layer but this requires, on the other hand, that the resistivity may not be too small. It is preferred that the resistivity for the inner and outer layers is in the range $10^{-6}$ Ωcm–100 kΩ cm, suitably $10^{-3}$–1000 Ωcm, preferably 1–500 Ωcm.

The use of a cable of a flexible type for forming the winding means that the winding work may occur by means of a threading operation where the cable is threaded into the openings of the slots in the magnetic cores.

Since the outer semiconducting layer is connected to earth potential or otherwise a relatively low potential, it will essentially operate for enclosing the electrical field inwardly of the layer. The use of an insulation system comprising a solid insulation surrounded by inner and outer semiconducting layers for enclosing the electrical field in the insulation means a substantial improvement compared with the prior art and eliminates entirely the need for resorting to liquid or gaseous insulation materials.

In order to master the problems occurring with direct connection of rotating electric machines to all kinds of high voltage power networks, a machine according to the invention has a number of features, which substantially distinguishes it from the prior art with respect to classical machine technology and the machine technology which has been published during the last years:

as has been mentioned, the winding is made of a cable having one or more solidly insulated conductors with a conducting layer around the insulation. A few typical conductors of this kind is XLPE-cable (Cross linked polyethylene) or a cable with EP-rubber insulation (EP= ethylene-propylene); however, the cable must be further developed both as far as the strands of the conductor and as far as the semiconducting layers are concerned cables are preferably used with a circular cross section. However, in order to obtain a better packing density, cables with another cross section may be used use of such a cable allows the magnetic core to be designed in a new and optimal manner according to the invention both with respect to slots and teeth the winding is carried out with a trapped insulation for the best possible use of the magnetic core the design of the slots is adapted to the cross section of the cable of the winding in such a way that the slots are formed as a number of axially and radially outwardly of each other extending cylindrical openings with an open waist running between the layers of the stator winding the design of the grooves is adjusted to the cable cross section in view the design of the slots is adapted to the trapped insulation of the slots the development with respect to the strands means that the conductor of the winding consists of a number of layers combined with each other, i.e. not necessarily adequately transposed with respect to each other, of strands, including both uninsulated and insulated strands the development with respect to the outer casing means that the outer casing is cut off at suitable locations along the length of the conductor and each cut-off partial length is directly connected to earth potential the winding is preferably carried out as a multi-layer concentrical cable winding to decrease the number of coil-end crossings.

These features involve a number of advantages relative to machines according to the prior art:

the trapped insulation means that a nearly constant tooth width may be used independently of the radial propagation the use of such a cable means that the outer semiconducting layer of the winding may be kept at earth potential along the whole length thereof an important advantage is that the electrical field is near zero in the coil-end region outside the outer semiconducting layer and that the electrical field does not have to be controlled when the layer is at earth potential. This means that one cannot get any field concentrations, neither in the core, in coil-end regions nor in the transition therebetween the mixture of insulated as well as uninsulated combined strands and transposed strands alternatively involve low additional costs.

To summarize, a rotating electric machine according to the invention means a considerable number of important advantages in relation to corresponding prior art machines. First of all, the machine can be connected directly to a power network at all types of high voltage. Another important advantage is that earth potential has been consistently conducted along the whole winding, which means that the coil-end region can be made compact and that support means in the coil-end region can be applied at practically earth potential. Still another important advantage is that oil-based insulation and cooling systems disappear. This means that no sealing problems may arise and that the dielectric ring previously mentioned is not needed. One advantage is also that all forced cooling can be made at ground potential. A considerable space and weight saving from the installation point of view is obtained with a rotating electric machine according to the invention, since it replaces a previous insulation design with both a machine and a step-up transformer.

Further advantages and features of the invention, particularly with respect to the method according to the invention, appears from the following description and claims.

BRIEF DESCRIPTION OF THE DRAWINGS

With reference to the enclosed drawings, a more specific description of an embodiment example of the invention follows hereinafter.

In the drawings.

DETAILED DESCRIPTION OF PREFERRED EMBODIMENTS

Figure 1:
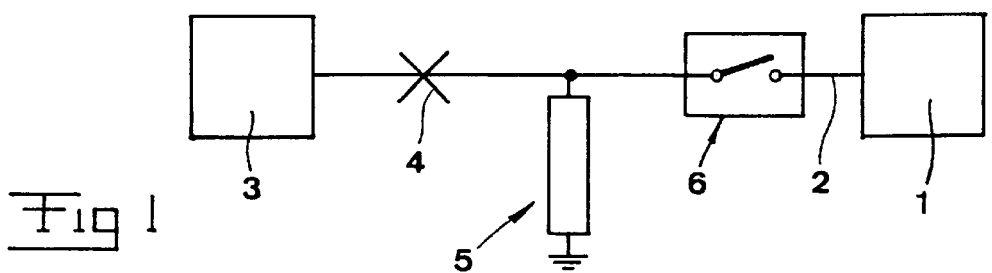
FIG. 1 is a purely diagrammatical view illustrating the basic aspects behind the solution according to the invention.

An electric power plant comprising a protected object 1 is shown in FIG. 1. As is described hereunder, this object could for instance consist of a generator. This object is connected, via a line 2, to an external distribution network 3. Instead of such a network, the unit denoted 3 could be formed by some other equipment contained in the power plant. The power plant involved is conceived to be of such a nature that it is the object 1 itself which primarily is intended to be protected against fault currents from the network/equipment 3 when there occurs a fault in the object 1 giving rise to a fault current from the network/equipment 3 towards the object 1 so that the fault current will flow through the object. Said fault may consist in a short-circuit having been formed in the object 1. A short-circuit is a conduction path, which is not intended, between two or more points. The short-circuit may for instance consist of an arc. This short-circuit and the resulting violent current flow may involve considerable damages and even a total break-down of the object 1.

It is already pointed out that with at least some types of protected electrical objects 1, short-circuit currents/fault currents harmful to the object in question may flow from the protected object towards the network/equipment 3. Within the scope of the invention, it is intended to be used for protection purposes not only for protection of the object from externally emanating fault currents flowing towards the object but also from internal fault currents in the objects flowing in the opposite direction. This will be discussed in more detail in the following.

In the following, the designation 3 will, to simplify the description, always be mentioned as consisting of an external power network. However, it should be kept in mind that some other equipment may be involved instead of such a network, as long as said equipment causes violent current flows through the object 1 when there is a fault.

Figure 2A:
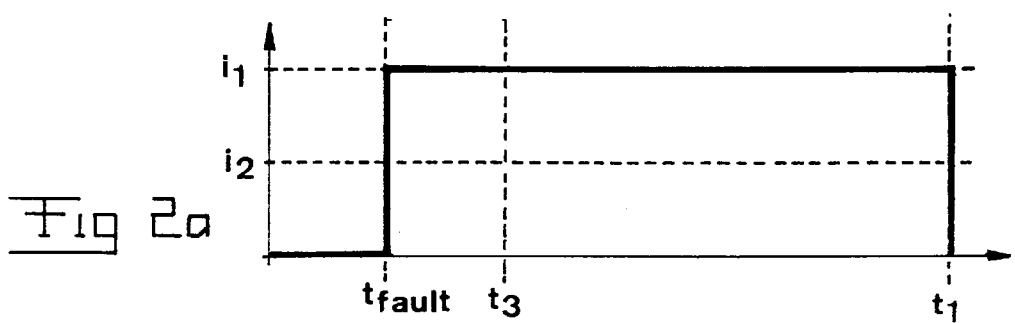
FIGS. 2–2d are diagrams illustrating in a diagrammatical form and in a comparative way fault current developments and the energy development with and without the protection device according to the invention.
Figure 2B:
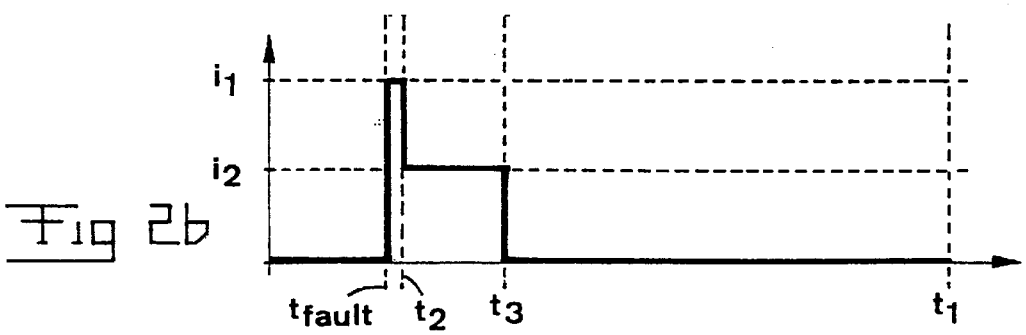

A conventional circuit breaker 4 is arranged in the line 2 between the object 1 and the network 3. This circuit breaker comprises at least one own sensor for sensing circumstances indicative of the fact that there is an overcurrent flowing in the line 2. Such circumstances may be currents/voltages but also other indicating that a fault is at hand. For instance, the sensor may be an arc sensor or a sensor recording short circuit sound etc. When the sensor indicates that the overcurrent is over a certain level, the circuit breaker 4 is activated for breaking of the connection between the object 1 and the network 3. The circuit breaker 4 must, however, break the total short circuit current/fault current. Thus, the circuit breaker must be designed to fulfil highly placed requirements, which in practice means that it will operate relatively slowly. In FIG. 2a it is illustrated in a current/time-diagram that when a fault, for instance a short circuit in the object 1, occurs at the time $t_{fault}$, the fault current in the line denoted 2 in FIG. 1 rapidly assumes the magnitude $i_1$. This fault current $i_1$ is broken by means of the circuit breaker 4 at $t_1$, which is at least within 150 ms after $t_{fault}$. FIG. 2b illustrates the diagram $i^2 \cdot t$ and, accordingly, the energy developed in the protected object 1 as a consequence of the short circuit therein. The energy injection into the object occurring as a consequence of the short-circuit current is, accordingly, represented by the total area of the outer rectangle in FIG. 2d.

Figure 2C:
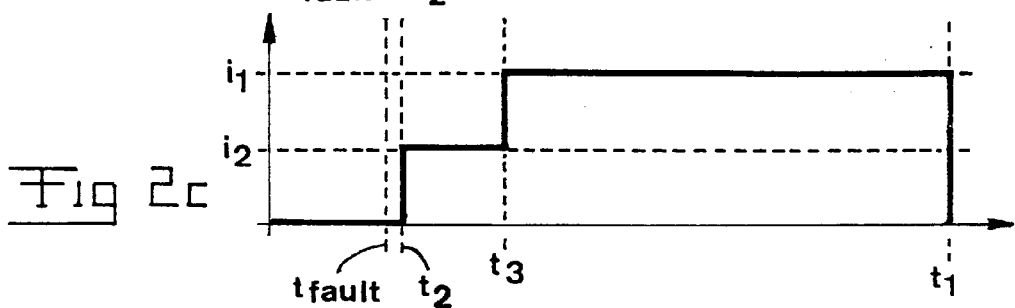
Figure 2D:
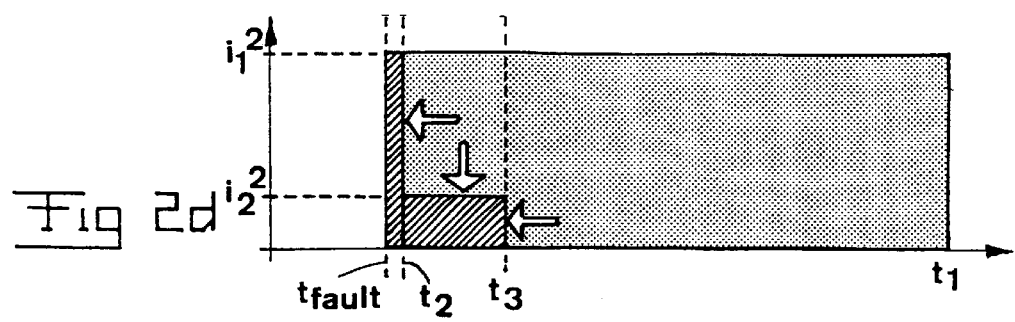

It is in this connection pointed out that the fault current in FIGS. 2a–c and the currents in FIG. 2d represent the envelope of the extreme value. Only one polarity has been drawn out in the diagram for the sake of simplicity.

The circuit breaker 4 is of such a design that it establishes galvanic separation by separation of metallic contacts. Accordingly, the circuit breaker 4 comprises, as a rule, required auxiliary equipment for arc extinguishing.

According to the invention the line 2 between the object 1 and the switching device 4 is connected to an arrangement reducing overcurrents towards the apparatus 1 and generally denoted 5. The arrangement is actuatable for overcurrent reduction with the assistance of an overcurrent conditions detecting arrangement within a time period substantially less than the break time of the circuit breaker 4. This arrangement 5 is, accordingly, designed such that it does not have to establish any galvanic separation. Therefore, conditions are created to very rapidly establish a current reduction without having to accomplish any total elimination of the current flowing from the network 3 towards the protected object 1. FIG. 2b illustrates in contrast to the case according to FIG. 2a that the overcurrent reducing arrangement 5 according to the invention is activated upon occurrence of a short circuit current at the time $t_{fault}$ for over-current reduction to the level $i_2$ at the time $t_2$. The time interval $t_{fault}$–$t_2$ represents, accordingly, the reaction time of the overcurrent reducing arrangement 5. The task of the arrangement 5 not to break but only reduce the fault current, the arrangement may be caused to react extremely rapidly, which will be discussed more closely hereunder. As an example, it may be mentioned that current reduction from the level $i_1$ to the level $i_2$ is intended to be accomplished within one or a few ms after unacceptable overcurrent conditions having been detected. It is then aimed at to accomplish the current reduction in a shorter time than 1 ms, and preferably more rapidly than 1 microsecond.

As appears from FIG. 1, the device comprises a further breaker generally denoted 6 and arranged in the line 2 between the circuit breaker 4 and the object 1. This further breaker is designed to break a lower voltage and currents than the circuit breaker 4 and may, as a consequence thereof, be designed to operate with shorter break times than the circuit breaker. The further breaker 6 is arranged to break not until after the overcurrent from the network 3 towards the object 1 has been reduced by means of the overcurrent reducing arrangement 5 but substantially earlier than the circuit breaker 4. From that stated, it appears that the further breaker 6 should be coupled to the line 2 in such a way that it is the current reduced by means of the overcurrent reducing arrangement 5 which will flow through the further breaker and which, accordingly, is to be broken by means thereof. FIG. 2b illustrates the action of the further breaker 6. This breaker is, more specifically, designed to break at the time $t_3$, which means that the duration of the current $i_2$ reduced by means of the overcurrent reducing arrangement 5 is substantially delimited, namely to the time period $t_2$–$t_3$. The consequence is that the energy injection into the protected object 1 caused by a fault current from the network 3 is represented by the surfaces marked with oblique lines in FIG. 2d. It appears that a drastic reduction of the energy injection is achieved. In this connection it is pointed out that since, according to a specific model, the energy increases with the square of the current, a reduction to one half of the current reduces the energy injection to a fourth. It is illustrated in FIG. 2c how the fault current will flow through the arrangement 5.

The dimensioning of the arrangement 5 and the further breaker 6 is conceived to be carried out such that the arrangement 5 reduces the fault current and the voltage to be broken by means of the further breaker 6 to substantially lower levels. A realistic break time as to the further breaker 6 is 1 ms. However, the dimensioning should be made such that the breaker 6 is caused to break not until after the arrangement 5 having reduced the current flowing through the breaker 6 to at least a substantial degree.

Figure 3:
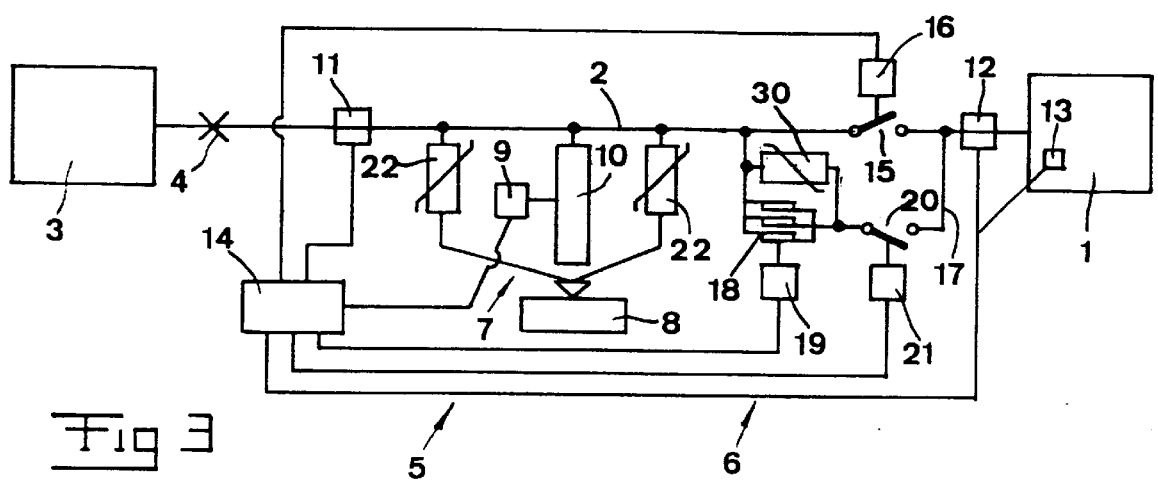
FIG. 3 is a diagrammatical view illustrating a conceivable design of a device according to the invention.

It is illustrated in more detail in FIG. 3 how the device may be realised. It is then pointed out that the invention is applicable in direct current (also HVDC=High Voltage Direct Current) and alternating-current connections. In the latter case, the line denoted 2 may be considered to form one of the phases in a multiphase alternating-current system. However, it should be kept in mind that the device according to the invention may be realised so that either all phases are subjected to the protection function according to the invention in case of a detected fault or that only that phase or those phases where a fault current occurs which are subjected to current reduction.

It appears from FIG. 3 that the overcurrent reducing arrangement generally denoted 5 comprises an over-current diverter 7 for diverting overcurrents to earth 8 or otherwise another unit having a lower potential than the network 3. Thus, the overcurrent diverter may be considered as forming a current divider which rapidly establishes a short circuit to earth or otherwise a low potential 8 for the purpose of diverting at least a substantial part of the current flowing in the line 2 so that said current does not reach the object 1 to be protected. If there is a serious fault in the object 1, for instance a short circuit, which is of the same magnitude as the short circuit that the overcurrent diverter 7 is capable of establishing, it may be said that generally speaking a reduction to one half of the current flowing to the object 1 from the network 3 is achieved as a consequence of the overcurrent diverter 7 in case the fault is close to the latter. In comparison with FIG. 2b, it appears, accordingly, that the current level $i_2$ illustrated therein and being indicated to amount to approximatively half of $i_1$ may be said to represent the worst occurring case. Under normal conditions, the purpose is that the over-current diverter 7 should be able to establish a short circuit having a better conductivity than the one corresponding to the short circuit fault in the object 1 to be protected so that accordingly a main part of the fault current is diverted to earth or otherwise a lower potential via the overcurrent diverter 7. It appears from this that, accordingly, in a normal fault case, the energy injection into the object 1 in case of a fault becomes substantially smaller than that which is indicated in FIG. 2d as a consequence of lower current level $i_2$ as well as shorter time span $t_2$–$t_3$.

The overcurrent diverter 7 comprises switch means coupled between earth 8 or-said lower potential and the line 2 between the object 1 and the network 3. This switch means comprises a control member 9 and a switch member 10. This switch member may for instance be formed by at least one semiconductor component, for instance a thyristor, which is open in a normal state, i.e. isolating in relation to earth, but via the control member 9 may be brought into an active, conducting state in a very short time in order to establish current reduction by diversion to earth.

FIG. 3 illustrates that an overcurrent conditions detecting arrangement may comprise at least one and preferably several sensors 11–13 suitable for detecting such overcurrent situations requiring activation of the protection function. As also appears from FIG. 3, these sensors may include the sensor denoted 13 located in the object 1 or in its vicinity. Furthermore, the detector arrangement comprises a sensor 11 adapted to sense overcurrent conditions in the line 2 upstreams of the connection of the over-current reducing arrangement 5 and the line 2. As is also explained in the following, it is suitable that a further sensor 12 is provided to sense the current flowing in the line 2 towards the object 1 to be protected, i.e. the current which has been reduced by means of the over-current reducing arrangement 5. In addition, it is pointed out that the sensor 12, as well as possibly the sensor 13, is capable of sensing the current flowing in the line 2 in a direction away from the object 1, for instance in cases where energy magnetically stored in the object 1 gives rise to a current directed away from the object 1.

It is pointed out that the sensors 11–13 do not necessarily have to be constituted by only current and/or voltage sensing sensors. Within the scope of the invention, the sensors may be of such nature that they generally speaking may sense any conditions indicative of the occurrence of a fault of the nature requiring initiation of a protection function.

In cases where such a fault occurs that the fault current will flow in a direction away from the object 1, the device is designed such that the control unit 14 thereof will control the further breaker 6 to closing, in case it would have been open, and, in addition, the over-current reducing arrangement 5 is activated such that the short circuit current may be diverted by means of the same.

When, for example, the object 1 is conceived to consist of a generator, the function on occurrence of a short circuit therein could be such that the short circuit first gives rise to a violent flow of current into the generator, which is detected and gives rise to activation of the arrangement 5 for the purpose of current diversion. When the current flowing towards the generator 1 has been reduced in a required degree, the breaker 6 is caused to break, but, controlled by means of the control unit 14, not earlier than leaving time for the energy, in occurring cases, magnetically stored in the generator 1 to flow away from the generator 1 and be diverted via the arrangement 5.

Furthermore, the device comprises a control unit generally denoted 14. This is connected to the sensors 11–13, to the overcurrent reducing arrangement 5 and to the further breaker 6. The operation is such that when the control unit 14 via one or more of the sensors 11–13 receives signals indicating occurrence of unacceptable fault currents towards the object 1, the overcurrent reducing arrangement 5 is immediately controlled to rapidly provide the required current reduction. The control unit 14 may be arranged such that when the sensor 12 has sensed that the current or voltage has been reduced to a sufficient degree, it controls the breaker 6 to obtain operation thereof for breaking when the overcurrent is below a predetermined level. Such a design ensures that the breaker 6 is not caused to break until the current really has been reduced to such a degree that the breaker 6 is not given the task to break such a high current that it is not adequately dimensioned for that purpose. However, the embodiment may alternatively also be such that the breaker 6 is controlled to break a certain predetermined time after the overcurrent reducing arrangement having been controlled to carry out current reduction.

The circuit breaker 4 may comprise a detector arrangement of its own for detection of overcurrent situations or otherwise the circuit breaker may be controlled via the control unit 14 based upon information from the same sensors 11–13 also controlling the operation of the overcurrent reducing arrangement.

It is illustrated in FIG. 3 that the further breaker 6 comprises a switch 15 having metallic contacts. This switch 15 is operable between breaking and closing positions by means of an operating member 16, which in turn is controlled by the control unit 14. A shunt line 17 is connected in parallel over this switch 15, said shunt line comprising one or more components 18 intended to avoid arcs on separation of the contacts of the switch 15 by causing the shunt line 17 to take over the current conduction from the contacts. These components are designed so that they may break or restrict the current. Thus, the purpose is that the components 18 normally should keep the conduction path in the shunt line 17 interrupted but close the shunt line when the switch 15 is to be opened so that accordingly the current is shunted past the switch 15 and in that way arcs do not occur or possibly occurring arcs are efficiently extinguished. The components 18 comprise one or more associated control members 19 connected to the control unit 14 for control purposes. According to one embodiment of the invention, said components 18 are controllable semiconductor components, for instance GTO thyristors, having necessary surge arresters 30.

A disconnector 20 for galvanic separation in the current conduction path created by means of the shunt line 17 to the object 1 to be protected is arranged in series with said one or more components 18. This disconnector 20 is via an operating member 21 controlled by the control unit 14. The disconnector 20 is illustrated in FIG. 3 as being placed in the shunt line 17 itself. This is of course not necessary. The disconnector 20 could also be placed in the line 2 as long as it ensures real galvanic separation, by series coupling with said one or more components 18, in the conduction path established by means of said series coupling so that accordingly there is not any possibility for current to flow through the components 18.

The device as it has been described so far operates in the following manner: In absence of a fault, the circuit breaker 4 is closed just like the switch 15 of the further breaker 6. The components 18 in the shunt line 17 are in a non-conducting state. The disconnector 20 is closed. Finally, the switch means 10 of the overcurrent reducing arrangement 5 is open, i.e. it is in a non-conducting state. In this situation the switch means 10 must, of course, have an adequate electrical strength so that it is not inadvertently brought into a conducting state. Overvoltage conditions occurring in the line 2 as a consequence of atmospheric (lightning stroke) circumstances or coupling measures may, accordingly, not involve the voltage strength of the switch means 10 in its non-conducting state to be exceeded. For this purpose it is suitable to couple at least one surge arrester 22 in parallel with the switch means 10. In the example such surge arresters are illustrated on both sides of the switch means 10. Accordingly, the surge arresters have the purpose to divert such overvoltages which otherwise could involve a risk for inadvertent breakthrough in the switch means 10.

When an over-current state has been registered by means of some of the sensors 11–13 or the own sensor (it is of course realized that information from the own sensor of the circuit breaker 4 may be used as a basis for control of the over-current reducing arrangement 5 according to the invention) of the circuit breaker 4 and this over-current state is of such magnitude that a serious fault of the object 1 is expected to be at hand, a breaking operation is initiated as far as the circuit breaker 4 is concerned. In addition, the control unit 14 controls the over-current reducing arrangement 5 to effect such reduction, and this more specifically by bringing, via the control member 9, the switch means 10 into an electrically conducting state. As described before, this may occur very rapidly, i.e. in a fraction of the time required for breaking by means of the circuit breaker 4, for what reason the object 1 to be protected immediately is liberated from the full short-circuit current from the network 3 as a consequence of the switch means 10 diverting at least an essential part, and in practice the main part, of the current to earth or otherwise a lower potential. As soon as the current, which flows towards the object 1 via the further breaker 6, has been reduced in a required degree, which can be established on a pure time basis by a time difference between activation of the switch means 10 and operation of the breaker 6, or by sensing of the current flowing in the line 2 by means of, for instance, the sensor 12, the operating member 16 of the switch 15 is, via the control unit 14, controlled to open the contacts of the switch 15. For extinguishing or avoiding arcs, the components 18, e.g. GTO thyristors or gas switches, are via the control members 19 controlled to establish conductivity of the shunt line 17. When the switch 15 has been opened and, thus, provided galvanic separation, the component 18 is again controlled to bring the shunt line 17 into a non-conducting state. In that way the current from the network 3 towards the object 1 has been efficiently cut off. After having brought the shunt line 17 into a non-conducting state, galvanic separation may, in addition, be effected by means of the disconnector 20 by controlling the operating member 21 thereof from the control unit 14. When all these incidents have occurred, breaking by means of the circuit breaker 4 occurs as a last incident. It is important to note that the over-current reducing arrangement as well as the further breaker 6 according to a first embodiment can be operated repeatedly. Thus, when it has been established by means of the sensors 11–13 that the circuit breaker 4 has been brought to cut off, the switch means 10 is reset to a non-conducting state and the switch 15 and the disconnector 20 are again closed so that when the circuit breaker 4 next time closes, the protection device is completely operable. According to another embodiment, it is, however, contemplated that the over-current reducing arrangement 5 may require exchange of one or more parts in order to operate again.

It is pointed out that according to an alternative embodiment of the invention, the component or components 18 could be brought into a conducting state as soon as the over-current reducing arrangement 5 has been brought into a closing state and this independently of whether the switch 15 possibly is not opened thereafter. The control of the components 18 could then, as described before, occur via the control unit 14 or, alternatively, by means of a control function involving a slavish following of the closing of the arrangement 5.

Figure 4:
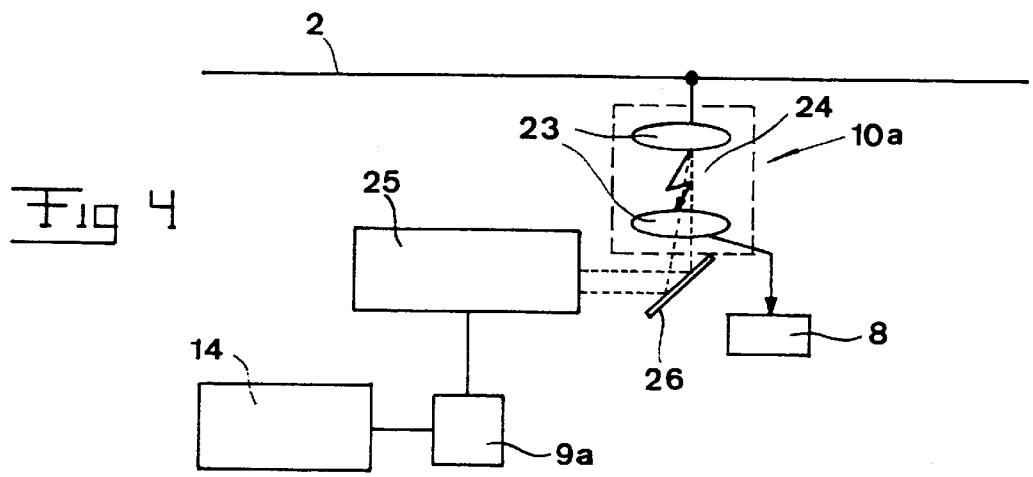
FIG. 4 is a diagrammatical view illustrating a possible design of the over-current reducing arrangement.

FIG. 4 illustrates an alternative embodiment of the over-current reducing arrangement 5. Instead of relying on a semiconductor switch means as in FIG. 3, the embodiment according to FIG. 4 is intended to involve causing of a medium present in a gap 24 between electrodes 23 to assume electrical conductivity by means of a control member 9a. This control member is arranged to control the operation of members 25 for causing or at least initiating the medium or a part thereof in the gap 24 into a conducting state. Said member 25 is in the example arranged to cause the medium in the gap 24 to assume electrical conductivity by causing or at least assisting in causing the medium to ionization/plasma. It is preferred that the members 25 comprise at least one laser, which by energy supply to the medium in the gap 24 provides for the ionization. As appears from FIG. 4, a mirror 26 may be used for necessary diverting of the laser beam bundle. It is in this connection pointed out that the embodiment according to FIG. 4 may be such that the means 25 do not alone give rise to ionization/plasma in the entire electrode gap. Thus, the intention may be that an electrical field imposed over the gap should contribute in ionization/plasma formation, only a part of the medium in the gap being ionized by means of the members 25 so that thereafter the electrical field in the gap gives rise to establishment of plasma in the entire gap. It is in this connection pointed out that there may be in the electrode gap not only a medium consisting of various gases or gas mixtures but also vacuum. In the case of vacuum, initiation by means of laser occurs at at least one of the electrodes, which, accordingly, will function as an electrone and ion transmitter for establishment of an ionized environment/a plasma in the electrode gap.

Figure 5:
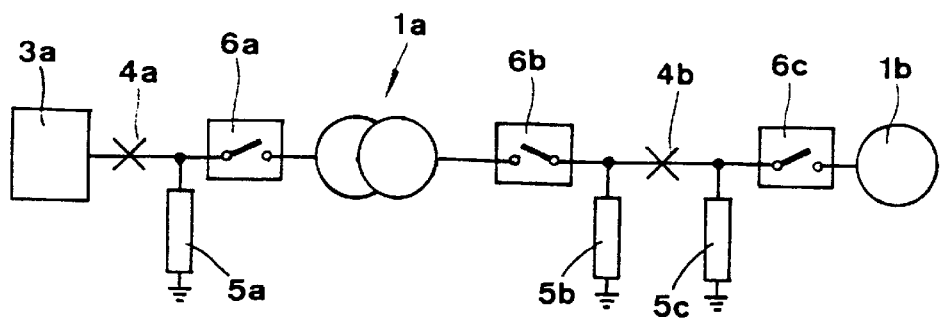
FIG. 5 is a diagrammatical view illustrating the device according to the invention applied in an electrical power plant comprising a generator, a transformer and a power network connected thereto.

FIG. 5 illustrates a conventional embodiment in the sense that a generator 1b via a transformer 1a is coupled to a power network 3a. The objects to be protected are, accordingly, represented by the transformer 1a and the generator 1b. The over-current reducing arrangement 5a and the further breaker 6a and the ordinary circuit breaker 4a are, as can be seen, arranged similar to what appears from FIG. 1 for the case that the object 1 shown therein is conceived to form the object 1a according to FIG. 5. Accordingly, reference is in this regard made to the descriptions delivered with respect to FIG. 1. The same is due for the protection function of the over-current reducing arrangement 5c and the further breaker 6c with respect to the generator 1b. In this case, the generator 1b could, accordingly, be considered equivalent with the object 1 in FIG. 1 whereas the transformer 1a could be considered equivalent to the equipment 3 in FIG. 1. Thus, the over-current reducing arrangement 5c and the further breaker 6c will, in combination with the conventional circuit breaker 4b, be able to protect the generator 1 against violent flow of current in a direction away from the transformer 1a.

As an additional aspect in FIG. 5, the additional over-current reducing arrangement 5b with associated further breakers 6b are present. As can be seen, there will be over-current reducing arrangements 5a and 5b on either side of the transformer 1a. It is then pointed out that the further breakers 6a and 6b respectively are arranged in the connections between said over-current reducing arrangements 5a and 5b and the transformer 1a. The further over-current reducing arrangement 5b is intended to protect the transformer 1a from current flows towards the transformer from the generator 1b. As can be seen, the circuit breaker 4b will be able to break independently of in which direction between the objects 1a and 1b a protection function is desired.

With the assistance of FIGS. 6 and 7, an embodiment will now be described which is "non-conventional" in contrast to the one in FIG. 5 in the sense that a rotating electric machine with a magnetic circuit or high voltage is intended to be connectable directly to the high voltage power network 3, 3a without any intermediate step-up transformer.

An important condition for being able to manufacture a non-conventional magnetic circuit is to use for the winding a conductor cable with a solid electrical insulation with a semiconducting layer both at the conductor and casing. Such cables are available as standard cables for other power engineering fields of use. As mentioned before, a further developed embodiment of such a standard cable is used as a stator winding. To be able to describe an embodiment, initially a short description of a standard cable will be made. The inner current-carrying conductor comprises a number of non-insulated strands. Around the strands there is a semiconducting inner casing. Around this semiconducting inner casing, there is an insulating layer of solid insulation. An example of such solid insulation is crosslinked polyethylene (XLPE), alternatively ethylene-propylene (EP)-rubber. This insulating layer is surrounded by an outer semiconducting layer which in turn is surrounded by a metal shield and a mantle Such a cable will be referred to hereunder as a power cable.

Figure 6:
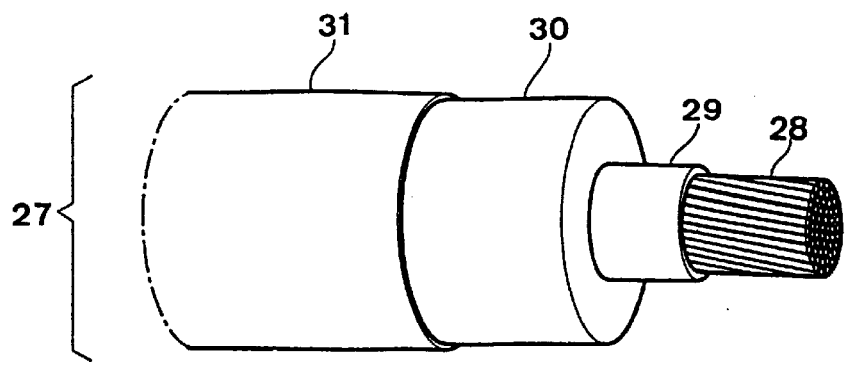
FIG. 6 illustrates parts contained in a cable intended to form the winding for a magnetic circuit of a rotating electric machine of a kind particularly well suited to be protected by the protection device according to the invention.
Figure 7:
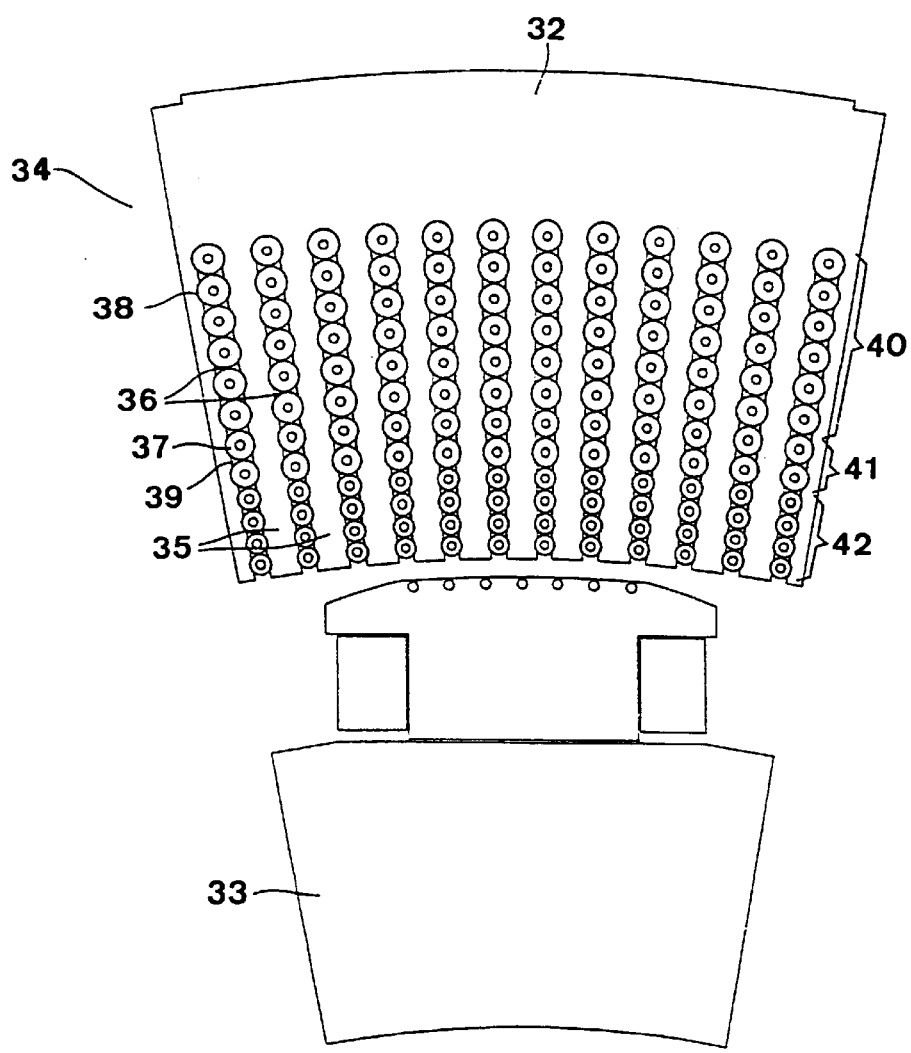
FIG. 7 illustrates in an axial end view an embodiment of a sector/pole pitch of a magnetic circuit in a rotating electric machine, for which the protection device according to the invention is particularly well suited.

A preferred embodiment of the further developed cable appears from FIG. 6. The cable 27 is described in the figure as comprising a current-carrying conductor 28 which comprises transposed both non-insulated and insulated strands. Electromechanically -transposed, solidly insulated strands are also possible. Around the conductor there is an inner semiconducting layer or casing 29 which, in turn, is surrounded by a layer 30 of a solid insulation material. The cable used as a winding in the preferred embodiment does not have metal shield and external sheath. To avoid induced currents and losses associated therewith in the outer semiconducting layer, this is cut off, preferably in the coil end, that is, in the transitions from the sheet stack to the end windings. Each cut-off part is then connected to ground, whereby the outer semiconducting layer 31 will be maintained at, or near, ground potential in the whole cable length. This means that, around the solid insulated winding at the coil ends, the contactable surfaces, and the surfaces which are dirty after some time of use, only have negligible potentials to ground, and they also cause negligible electric fields.

To optimize a rotating electric machine, the design of the magnetic circuit as regards the slots and the teeth, respectively, is of decisive importance. As mentioned above, the slots should connect as closely as possible to the casing of the coil sides. It is also desirable that the teeth at each radial level are as wide as possible. This is important to minimize the losses, the magnetization requirement, etc., of the machine.

With access to a conductor for the winding such as for example, the cable described above, there are great possibilities of being able to optimize the laminated magnetic core from several points of view. In the following, a magnetic circuit in the stator of the rotating electric machine is referred to. FIG. 7 shows an embodiment of an axial end view of a sector/pole pitch 32 of a machine according to the invention. The rotor with the rotor pole is designated 33 In conventional manner, the stator is composed of a laminated core of electric sheets successively composed of sector-shaped sheets. From a back portion 34 of the core, located at the radially outermost end, a number of teeth 35 extend radially inwards towards the rotor. Between the teeth there is a corresponding number of slots 36. The use of cables 37 according to the above among other things permits the depth of the slots for high-voltage machines to be made larger than what is possible according to the state of the art. The slots have a cross section which is reduced towards the rotor since the need of cable insulation becomes lower for each winding layer towards the rotor. As is clear from the figure, the slot substantially consists of a circular cross section 38 around each layer of the winding with narrower waist portions 39 between the layers. With some justification, such a slot cross section may be referred to as a "cycle chain slot". Since a relatively large numbers of layers will be required in such a high voltage machine and the availability of actual cable dimensions as far as insulation and outer semiconductor are concerned is restrictive, it may, in practice, be difficult to achieve a desirable continuous reduction of the cable insulation and the stator slot respectively. In the embodiment shown in FIG. 7, cables with three different dimensions of the cable insulation are used, arranged in three correspondingly dimensioned sections 40, 41 and 42, that is, in practice a modified cycle chain slot will be obtained. The figure also shows that the stator tooth can be shaped with a practically constant radial width along the depth of the whole slot.

In an alternative embodiment, the cable which is used as a winding may be a conventional power cable as the one described above. The grounding of the outer semiconducting shield then takes place by stripping the metal shield and the sheath of the cable at suitable locations.

The scope of the invention accommodates a large number of alternative embodiments, depending on the available cable dimensions as far as insulation and the outer semiconductor layer etc. are concerned, of a so-called cycle chain slot.

As mentioned above, the magnetic circuit may be located in the stator and/or the rotor of the rotating electric machine. However, the design of the magnetic circuit will largely correspond to the above description independently of whether the magnetic circuit is located in the stator and/or the rotor.

As winding, a winding is preferably used which may be described as a multilayer, concentric cable winding. Such a winding means that the number of crossings at the coil ends has been minimized by placing all the coils within the same group radially outside one another. This also permits a simpler method for the manufacture and the threading of the stator winding in the different slots.

It should be noted that the description presented hereinabove only should be considered as exemplifying for the inventive idea, on which the invention is built. Thus, it is obvious for the man skilled in the art that detailed modifications may be made without leaving the scope of the invention. As an example, it may be mentioned that it would be possible to use as a switch means 10 a mechanical switch.

What is claimed is:

1. A device in an electric power plant for protection of an object connected to an electric power network or another equipment included in the electric power plant from fault-related over-currents, the device comprising a switching device in a line between the object and the network/equipment, wherein the line between the object and the switching device is connected to an over-current reducing arrangement, which is actuatable for over-current reduction with assistance of an over-current conditions detecting arrangement within a time period substantially shorter than the break-time of the switching device, wherein the over-current arrangement comprises an over-current diverter for diverting over-currents to earth or otherwise another unit having a lower potential than the network/equipment, said over-current diverter including switch means coupled between earth or said lower potential and the line between the object and the network/equipment.

2. A device according to claim 1, wherein the switching device is formed by a circuit-breaker.

3. A device according to claim 1, wherein the switch comprises at least one semiconductor component.

4. A device according to claim 1, wherein the switch comprises an electrode gap and means for causing or at least initiating the electrode gap or at least a part thereof to assume electrical conductivity.

5. A device according to claim 6, wherein said means for causing or at least initiating the electrode gap to assume electrical conductivity being arranged to cause the gap or a part thereof to assume the form of a plasma.

6. A device according to claim 5, wherein said members for causing or at least initiating the electrode gap or a part thereof to assume electrical conductivity comprising at least one laser.

7. A device according to claim 5, wherein it comprises a further breaker arranged in the line between the switching device and the object, said further breaker being arranged between the over-current reducing arrangement and the object and being adapted to break lower voltages and currents than the switching device and therefore capable of performing a shorter break-time than the switching device, and that the further breaker is adapted to break when the over-current towards or away from the object has been reduced by means of the over-current reducing arrangement but substantially earlier than the switching device.

8. A device according to claim 7, wherein it comprises a control unit connected to the detecting arrangement and to the further breaker in order to achieve actuation of the further breaker for breaking purposes when the over-current towards or away from the object is indicated, by means of the detecting arrangement, to be under a predetermined level.

9. A device according to claim 7, wherein the further breaker comprises a switch, over which there is coupled a shunt line having one or more components for avoiding arcs on separation of contacts of the switch by causing the shunt line to take over current conduction from the contacts.

10. A device according to claim 9, wherein said one or more components in the shunt line are closable into conduction by means of control via the control unit.

11. A device according to claim 9, wherein said one or more components are formed by controllable semiconductor components.

12. A device according to claim 9, wherein said one or more components are provided with at least one search arrester.

13. A device according to claim 9, wherein a disconnector for galvanic separation is arranged in series with said one or more components.

14. A device according to claim 13, wherein the disconnector is coupled to the control unit to be controlled thereof for opening after the switch having been controlled to have closed and said one or more components having been placed in a condition for breaking the shunt line.

15. A device according to claim 1, wherein at least one search arrester is coupled in parallel with the over-current reducing arrangement.

16. A device according to claim 1, wherein two over-current reducing arrangements are arranged on either sides of the object to protect the same from two sides.

17. A device according to claim 1, wherein it comprises a control unit connected to the over-current reducing arrangement and to the over-current conditions detecting arrangement, said control unit being arranged to control the over-current reducing arrangement to closing based upon information from the over-current conditions detecting arrangement when required for reasons of protection.

18. A device according to claim 17, wherein one and the same control unit is arranged to control, based upon information from the over-current conditions detecting arrangement, the over-current reducing arrangement and the further breaker.

19. A device according to claim 1, wherein the protected object is formed by a rotating electric machine with magnetic circuit.

20. A device according to claim 19, wherein the rotating electric machine is formed by a generator, motor or synchronous compensator.

21. A device according to claim 20, wherein the generator is a hydro generator or turbo generator.

22. A device according to claim 19, wherein the magnetic circuit of the rotating electric machine is designed for high voltage.

23. A device according to claim 19, wherein the magnetic circuit includes a winding comprising at least one current-carrying conductor, about which there is arranged an electrically insulating layer of a solid insulation material, an outer layer of a semiconducting material being provided about the insulating layer, that an inner layer of a semiconducting material is arranged inwardly of the insulating layer and that said at least one conductor is arranged inwardly of the inner layer.

24. A device according to claim 23, wherein at least one of the inner and outer layers has substantially equal coefficient of thermal expansion as the insulating material.

25. A device according to claim 23, wherein the inner layer is in electrical contact with said at least one conductor.

26. A device according to claim 23, wherein the outer layer essentially forms an equipotential surface.

27. A device according to claim 23, wherein the magnetic circuit of the rotating electric machine comprises a winding formed by means of a cable.

28. A device according to claim 19, wherein the rotating electric machine is directly connected to the electric power network which is designed for high voltage, preferably 36 kV and more.

29. A device according to claim 21, wherein the magnetic circuit comprises one or more cores having slots for the winding.

30. A device according to claim 25, wherein the winding also comprises a metal shield and a mantle.

31. A device according to claim 19, wherein the magnetic circuit is arranged in the stator and/or rotor of the rotating electric machine.

32. A device according to claim 23, wherein the outer semiconducting layer is connected to earth potential.

33. A device according to claim 23, wherein the outer semiconducting layer is cut in a number of parts, which are each connected to earth potential.

34. A device according to claim 32, wherein with connection of the outer semiconducting layer to earth potential, the electric field of the machine outside the semiconducting layer both in the slots and in the coil-end region will be near zero.

35. A device according to claim 23, wherein when the cable comprises several conductors, these are transposed.

36. A device according to claim 25, wherein the current-carrying conductor/conductors comprise both non-insulated and insulated wires, stranded into a number of layers.

37. A device according to claim 25, wherein the current-carrying conductor/conductors comprise both non-insulated and insulated strands, transposed into a number of layers.

38. A device according to claim 29, wherein the slots are formed with a number of cylindrical openings separated by a narrower waist portion between the cylindrical openings.

39. A device according to claim 38, wherein the cross section of the cylindrical openings of the slots, counting from a back portion of the core, is designed continuously decreasing.

40. A device according to claim 38, wherein the cross section of the cylindrical openings of the slots, counting from a back portion of the laminated core, is designed discontinuously decreasing.

41. Use of a device according to claim 1 for protection of a rotating electric machine having a magnetic circuit against fault-related over-currents.

42. A method in an electric power plant for protection of an object connected to an electric power network or another equipment included in the electric power plant from fault-related over-currents, a switching device being placed in a line between the object and the network/equipment, wherein an over-current reducing arrangement connected to the line between the object and the switching device is activated for over-current reduction when over-current conditions have been detected by means of an arrangement for such detection, within a time period substantially less than the break-time of the switching device.

43. A method according to claim 42, wherein over-currents are diverted to earth or otherwise another unit having a lower potential than the net-work/equipment by means of the over-current reducing arrangement.

44. A method according to claim 42, wherein a further breaker, which is arranged in the line between the switching device and the object and between the over-current reducing arrangement and the object, is actuated for breaking after the over-current towards or away from the object having been reduced by means of the over-current reducing arrangement.

45. A method according to claim 44, wherein the over-current reducing arrangement is used for protection of an object in the form of a rotating electric machine having a magnetic circuit, in particular a generator, motor or synchronous compensator.

46. A device in an electric power plant for protection of an object connected to an electric power network or another equipment included in the electric power plant from fault-related over-currents, the device comprising a switching device in a line between the object and the network/equipment, the line between the object and the switching device being connected to an over-current reducing arrangement, which is actuatable for over-current reduction with assistance of an over-current conditions detecting arrangement within a time period substantially shorter than the break-time of the switching device, comprising a control unit connected to the over-current reducing arrangement and to the over-current conditions detecting arrangement, said control unit being arranged to control the over-current reducing arrangement to closing based upon information from the over-current conditions detecting arrangement when required for reasons of protection, and a further breaker arranged in the line between the switching device and the object, said further breaker being arranged between the over-current reducing arrangement and the object, wherein said control unit is arranged to control, based upon information from the over-current conditions detecting arrangement, the over-current reducing arrangement as well as the further breaker, and said control unit is arranged to control the further breaker to break when the over-current towards or away from the object has been reduced by means of the over-current reducing arrangement but substantially earlier than the switching device.

* * * * *